(12) United States Patent
Hatfield

(10) Patent No.: US 10,814,819 B2
(45) Date of Patent: Oct. 27, 2020

(54) EMBLEMED AIRBAG COVERS AND RELATED MANUFACTURING METHODS

(71) Applicant: Autoliv ASP, Inc., Ogden, UT (US)

(72) Inventor: Mark S. Hatfield, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 105 days.

(21) Appl. No.: 16/111,015

(22) Filed: Aug. 23, 2018

(65) Prior Publication Data

US 2020/0062208 A1    Feb. 27, 2020

(51) Int. Cl.
*B60R 21/215*    (2011.01)
*B60R 21/203*    (2006.01)

(52) U.S. Cl.
CPC ........ *B60R 21/215* (2013.01); *B60R 21/2037* (2013.01); *B60R 2021/21543* (2013.01)

(58) Field of Classification Search
CPC .............. B60R 21/215; B60R 21/2037; B60R 2021/21543; B60R 21/203
USPC ...................................................... 280/728.3
See application file for complete search history.

(56) References Cited

U.S. PATENT DOCUMENTS

| | | | | |
|---|---|---|---|---|
| 8,925,959 B2* | 1/2015 | Bosch | ................... | B60R 21/203 |
| | | | | 280/728.3 |
| 2006/0092659 A1* | 5/2006 | Bynum | ................... | B60Q 3/51 |
| | | | | 362/549 |
| 2008/0079241 A1* | 4/2008 | Fujimori | ........... | B60R 21/21656 |
| | | | | 280/727 |
| 2009/0121459 A1* | 5/2009 | Bostick | ................. | B60R 13/005 |
| | | | | 280/728.3 |
| 2009/0315306 A1* | 12/2009 | Worrell | .................. | B60Q 5/003 |
| | | | | 280/731 |
| 2010/0102538 A1* | 4/2010 | Paxton | ..................... | B60Q 3/64 |
| | | | | 280/728.3 |

(Continued)

FOREIGN PATENT DOCUMENTS

DE    102010033802          3/2011
DE    102010033802 B3 *  11/2011    ............. B21K 25/00

(Continued)

OTHER PUBLICATIONS

Machine Translation of DE-102010033802 (Year: 2010).*
Machine Translation of JP-2013141908 (Year: 2013).*
Machine Translation of DE102010033802 (6 pgs).*

*Primary Examiner* — Paul N Dickson
*Assistant Examiner* — Kurtis Nielson
(74) *Attorney, Agent, or Firm* — Matthew D. Thayne; Thayne and Davis PLLC

(57) ABSTRACT

Airbag covers having emblems and related methods. In some implementations, a fastening member comprising an elongated axis may be inserted through an opening formed within an airbag cover. The fastening member may comprise a cross-sectional shape that is substantially smaller in area along at least a portion of the fastening member than a cross-sectional shape of the opening adjacent to the fastening member such that open space is left between the fastening member and a portion of the airbag cover defining the opening. The fastening member may then be reshaped such that the cross-sectional shape of the fastening member within the opening changes to decrease the open space and secure the emblem to the airbag cover.

23 Claims, 14 Drawing Sheets

(56) References Cited

U.S. PATENT DOCUMENTS

2011/0273876 A1\* 11/2011 Stolyar ................ F21V 17/101
                                                        362/235
2012/0030980 A1\* 2/2012 Sella .................... B60R 21/215
                                                         40/663
2017/0001592 A1    1/2017 Jahme et al.

FOREIGN PATENT DOCUMENTS

JP         2013141908 A  * 7/2013
WO     WO2012020002       2/2012

\* cited by examiner

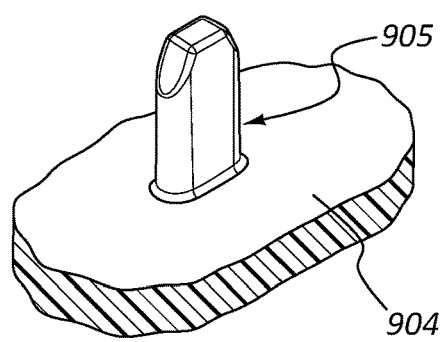
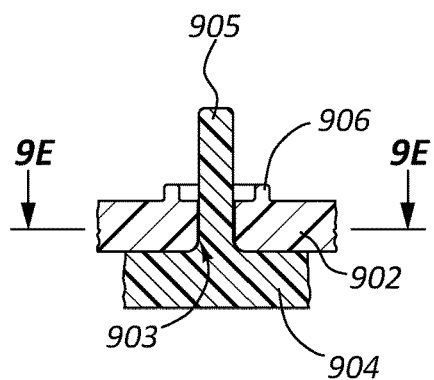
FIG. 9A          FIG. 9B
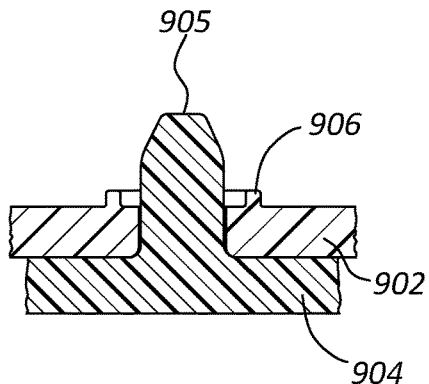
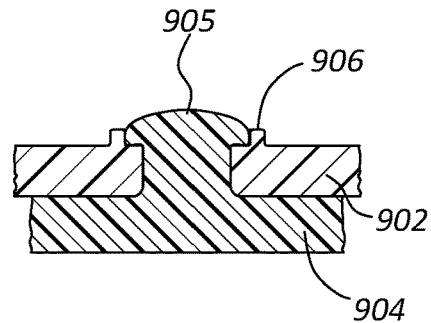
FIG. 9C          FIG. 9D
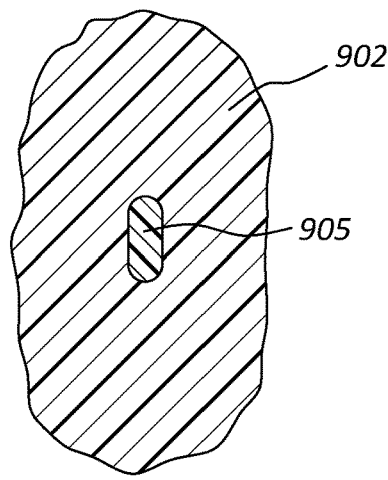
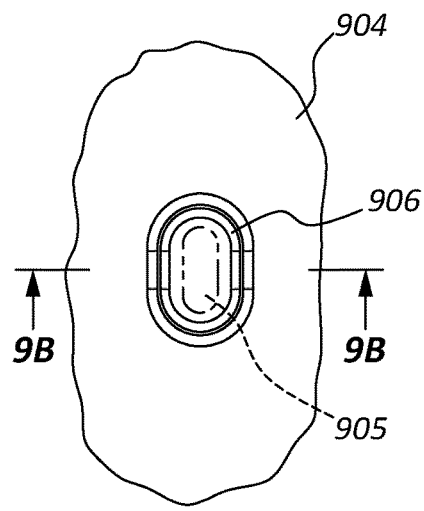
FIG. 9E          FIG. 9F

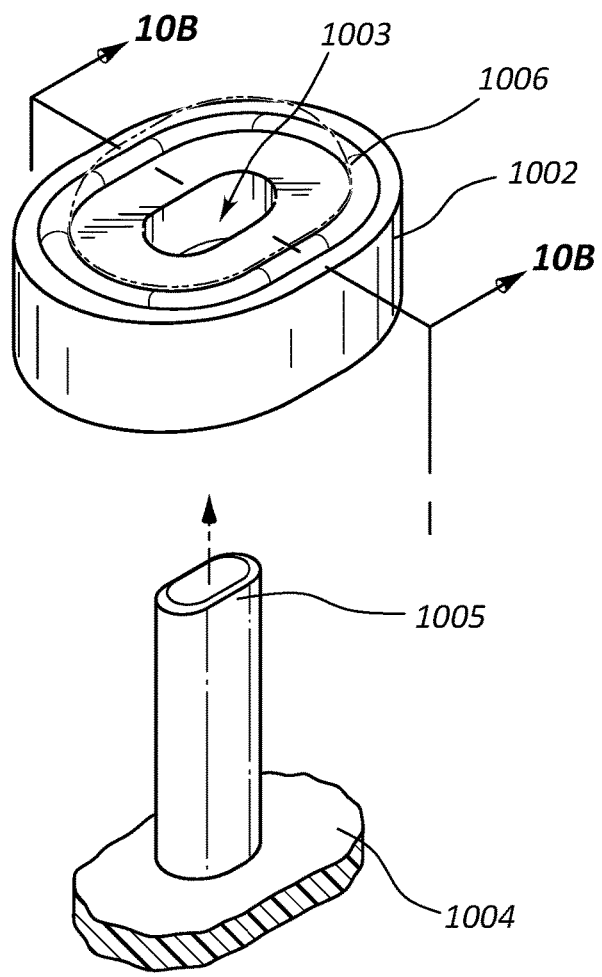
FIG. 10A
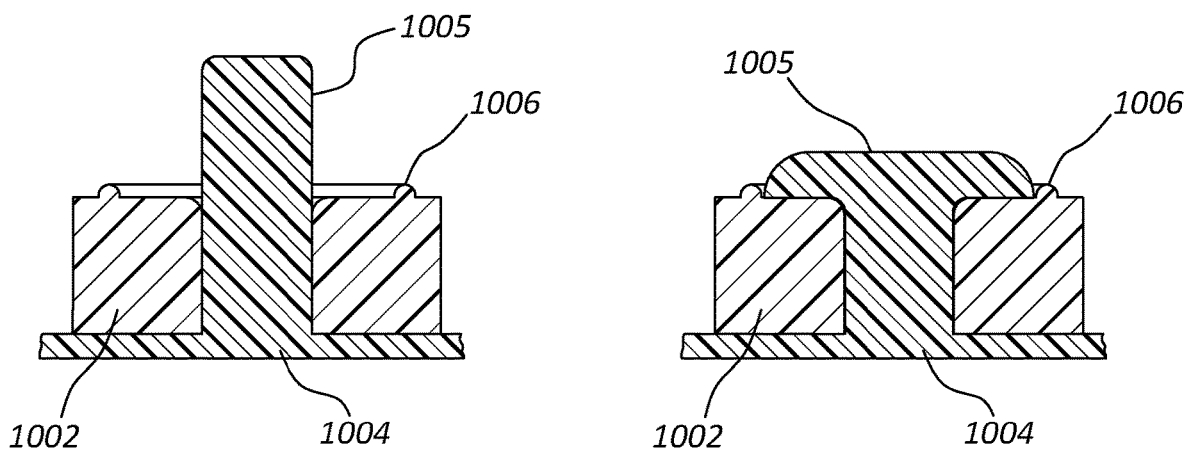
FIG. 10B   FIG. 10C

EMBLEMED AIRBAG COVERS AND RELATED MANUFACTURING METHODS

SUMMARY

Several methods are used for coupling an emblem, such as a design, symbol, logo, and/or text, to an airbag cover, such as an airbag cover used in connection with either a driver-side or passenger-side airbag cushion. However, the present inventor has noted that current methodologies result in vulnerabilities to detachment of such emblems, particularly during deployment.

The present inventor has therefore determined that it would be desirable to provide systems and methods that overcome one or more of the foregoing limitations and/or other limitations of the prior art by improving the coupling means to inhibit detachment, preferably without making the manufacturing process unduly complicated and/or expensive. Thus, in some embodiments, the inventive concepts disclosed herein may be used to provide an attachment means comprising one or more fastening members, such as fastening pins, each of which may be configured to extend through a hole or other opening formed in an airbag cover or other suitable coupling surface. The fastening member(s) may engage an opposite surface of the airbag cover relative to the emblem by, for example, forming a mushroomed or otherwise enlarged knob on an end of the fastening member(s). A barrier may extend about the perimeter of the opening on the coupling surface to facilitate containment and/or formation of the enlarged knob(s).

In some embodiments, the fastening member(s) may have an initial shape/size/dimension in cross section that is substantially smaller (i.e., smaller than the typical differences required in order to allow a fastening pin to enter and pass through the opening) than the cross-sectional shape/size/dimension of the opening. This may allow the fastening member(s) to be reshaped, such as by heating/thermal reshaping, to force material of the fastening member(s) against the wall of the opening (where empty space was prior to such processing) to thereby facilitate a more secure engagement that may be less prone to detachment during deployment.

In a more particular example of an airbag module according to some embodiments, the airbag module may comprise an airbag cover and an emblem element coupled to the airbag cover. One or more fastening members may extend from the emblem element through an opening in the airbag cover to secure the emblem to the airbag cover. A barrier may be positioned to extend from an inner surface of the airbag cover about a perimeter of the opening. The barrier may be configured to shape the fastening member during a manufacturing process for coupling the emblem element to the airbag cover using the fastening member. In some embodiments, the barrier may be configured such that an enlarged knob formed at a distal end of the fastening member sits on an upper surface of the barrier and no portion of the barrier extends further distally than the enlarged knob. In some embodiments, no portion of the barrier extends further laterally than the enlarged knob.

In some embodiments, the barrier may be spaced apart from the opening in the airbag cover along the inner surface of the airbag cover. In some such embodiments, the fastening member may comprise an enlarged knob formed at a distal end of the fastening member. The enlarged knob may contact and be contained by the barrier.

In some embodiments, the enlarged knob may extend beyond a height of the barrier. In other embodiments, the enlarged knob may extend to at least the substantially the same height as, or less than the height of, the barrier.

In some embodiments, the opening may comprise a thru-hole. In some embodiments, at least a portion of the hole or other opening(s) may comprise a conical shape in cross section.

In some embodiments, the opening may have a different shape, at least in part, than the adjacent portion of the fastening member, prior to processing. For example, the opening may comprise an oval shape in cross section and the fastening member may comprise a circular shape in cross section, or vice versa.

In an example of a method for coupling an emblem element to an airbag cover according to some implementations, the method may comprise inserting one or more fastening members through a corresponding one or more openings formed within an airbag cover. The fastening member(s) may comprise an elongated axis, and may comprise a cross-sectional shape that is substantially smaller in area along at least a portion of the fastening member than a cross-sectional shape of the opening adjacent to the fastening member such that open space is left between the fastening member(s) and a portion of the airbag cover defining the respective opening(s). The fastening member(s) may then be reshaped, such as by heating the fastening member(s) or otherwise thermally forming them such that the cross-sectional shape of the fastening member(s) within the opening changes to decrease the open space and secure an emblem element to the airbag cover.

In some implementations, the step of reshaping the fastening member may comprise fully occupying the open space such that the fastening member contacts the portion of the airbag cover defining the opening along the entire opening.

In some implementations, the fastening member may comprise a non-circular shape in cross-section, such as an oval shape.

In some implementations, the opening may comprise a distinct shape from the fastening member in cross section. Thus, the opening may comprise a circular cross-section and the fastening member may comprise an oval shape, or vice versa. In any event, in preferred embodiments and implementations, each of the fastening members may be configured to contact its respective opening in at least two locations prior to the reshaping step (such as on opposite sides in the elongated dimension for an oval shape).

In some implementations, the airbag cover may comprise a barrier extending from an inner surface of the airbag cover about a perimeter of the opening. In some such implementations, the barrier may be spaced apart from the opening in the airbag cover along the inner surface of the airbag cover, which may provide space for the barrier to contain and/or facilitate reshaping of the fastening member and/or allow for engagement between the enlarged portion of the fastening member and the inner surface of the airbag cover.

In some implementations, the step of reshaping the fastening member may comprise forming an enlarged knob at a distal end of the fastening member and contacting the enlarged knob with the barrier such that the barrier assists in formation of the enlarged knob.

In another example of a method for coupling an emblem element to an airbag cover, the method may comprise inserting a plurality of fastening members through a respective plurality of holes formed within an airbag cover. Each of the plurality of holes may comprise a barrier extending about a perimeter of its respective hole. Each of the plurality of fastening members may comprise an elongated axis, and each of the plurality of fastening members may comprise a cross-sectional shape that is substantially smaller in area along at least a portion of each of the plurality of fastening members than a cross-sectional shape of its respective hole adjacent each of the plurality of fastening members such that open space is left between each of the plurality of fastening members and a portion of the airbag cover defining each respective hole of the plurality of holes. Each of the plurality of fastening members may be thermally reshaped to occupy the open space of each of the plurality of holes with reshaped material from each of the plurality of fastening members and secure an emblem element to the airbag cover. Each of the plurality of fastening members may be formed with an enlarged knob at its distal end.

In some implementations, the step of thermally reshaping each of the plurality of fastening members may be performed in a manner such that the enlarged knob of each of the plurality of fastening members contacts the barrier and such that the barrier assists in formation of each of the enlarged knobs.

In some implementations, each of the plurality of fastening members may comprise a first shape in cross section, each of the plurality of holes may comprise a second shape in cross section, wherein the first shape differs from the second shape.

In another example of an airbag module according to other embodiments, the airbag module may comprise an airbag cover, an emblem element coupled to the airbag cover, and a fastening member extending from the emblem element through an opening in the airbag cover to secure the emblem element to the airbag cover. At least a portion of the fastening member contacting material defining the opening preferably comprises reshaped material. In other words, as described throughout this disclosure, in preferred embodiments and implementations, material from the original fastening member is reshaped to contact at least a portion of the surface defining the opening to wedge the reshaped material of the fastening member against this surface and provide a more secure coupling. In some such embodiments and implementations, a majority of the surface area defining the opening is contacted by such reshaped material. In some such embodiments and implementations, at least substantially an entire contact interface (in some such embodiments, the entire contact interface) between the fastening member and the material defining the opening comprises reshaped material.

For example, in some embodiments, two opposing points of contact may be provided prior to reshaping to ensure that the emblem is in a proper position and to facilitate stability during reshaping. As another example, in some embodiments, the size of the opening may taper such that, for example, in a proximal portion of the opening, there is little to no empty space to provide a stable, temporary coupling prior to fixation. The remainder of the contact interface may be made up of reshaped material contacting the surface of the opening following the reshaping process.

As used herein, the term "reshaped material" means material from an original fastening member that has been reshaped, thermally or otherwise, after being extended through an opening, to increase the surface area of contact between the fastening member and the inner surface or surfaces of the opening. Applicant further notes that, as used herein, this terminology is intended to exclude material that is reshaped only slightly to occupy a tolerance gap. Thus, in preferred embodiments, the invention may comprise forming a deliberate gap larger than a typical tolerance gap so that reshaped material from the fastening member can occupy the deliberate gap.

Some embodiments may further comprise a barrier extending from an inner surface of the airbag cover about a perimeter of the opening, wherein the barrier is configured to shape the fastening member during a manufacturing process for coupling the emblem element to the airbag cover using the fastening member. In some such embodiments, the barrier may be spaced apart from the opening in the airbag cover along the inner surface of the airbag cover. The fastening member may, as previously mentioned, comprise an enlarged knob formed at a distal end of the fastening member, which enlarged knob may, in some embodiments, contact and be contained by the barrier. In some embodiments, the enlarged knob may extend beyond a height of the barrier. In some embodiments, the barrier may be configured such that the enlarged knob sits on an upper surface of the barrier and no portion of the barrier extends further distally than the enlarged knob. In some embodiments, no portion of the barrier extends further laterally than the enlarged knob. In some embodiments, the opening comprises a non-circular shape in cross section. In some such embodiments, the opening comprises an oval shape in cross section.

In an example of an airbag cover or other emblemed airbag deployment surface, the cover may comprise emblem and one or more fastening members or other fastening means connected to the cover via one or more openings in the cover. The fastening member or other fastening means is preferably configured to be reshaped. Thus, prior to reshaping, the fastening member(s) or other fastening means and the opening(s) preferably have different cross-sectional shapes so that open space exists along one or more sides of the fastening member(s) inside the opening(s). After the fastening member(s) or other fastening means may therefore be reshaped to occupy the open space or spaces. Thus, following manufacturing/processing, the fastening member or other fastening means may comprise, within each respective opening, one or more reshaped portions contacting a portion of the surface defining the opening and, in some such embodiments, one or more portions comprising original fastening member material.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 9A is a perspective view of yet another emblem comprising a fastening pin according to other embodiments;

FIG. 9B is a cross-sectional view of the emblem of FIG. 9A inserted within an opening of an airbag cover;

FIG. 9C is another cross-sectional view of the emblem of FIG. 9A inserted within an opening of an airbag cover taken along a line perpendicular to that of FIG. 9B;

FIG. 9D is a cross-sectional view of the emblem and airbag cover of FIGS. 9B and 9C taken along line 9D-9D in FIG. 9B shown following processing;

FIG. 9E is a cross-sectional view of the fastening pin of FIGS. 9A-9C inserted with an airbag cover opening;

FIG. 9F is a plan view of the internal surface of an airbag cover with a fastening pin extending therethrough;

FIG. 10A depicts still another embodiment of a fastening pin for an emblem extending through an opening in an airbag cover;

FIG. 10B is a cross-sectional view of the fastening pin of FIG. 10A extending through the airbag cover opening;

FIG. 10C is a cross-sectional view of the emblem and airbag cover of FIG. 10B following processing;

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to coupling emblem elements with airbag modules, such as with airbag covers. In some embodiments, a plurality of fastening pins or other fastening members may be inserted through a corresponding plurality of holes formed in the airbag cover or another suitable portion of the airbag module. Preferably these fastening members are smaller in cross-sectional shape and/or size than their corresponding holes. During processing, the fastening members may then be reshaped to, preferably, fill their respective holes entirely to secure the emblem to the airbag module.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
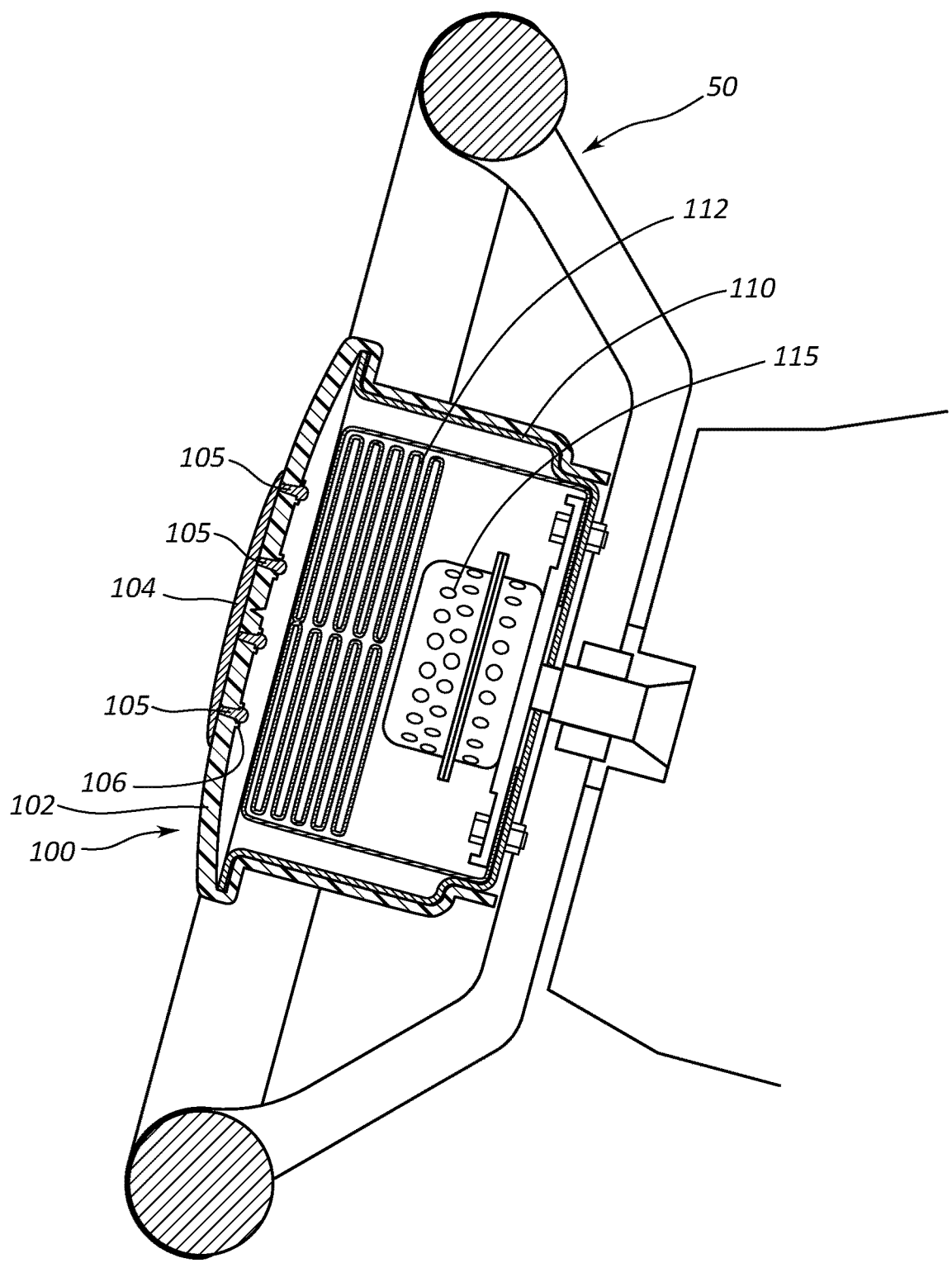
FIG. 1 is a cross-sectional view of a steering wheel airbag module comprising an emblemed airbag cover according to some embodiments.

FIG. 1 depicts an airbag module 100 for a steering wheel 50. Airbag module 100 comprises a cover 102, a housing 110, a cushion 112, and an inflator 115. An emblem 104, which may include, for example, a design, logo, alphanumeric text, or the like, is coupled with cover 102 on an exterior surface of emblem 104. Emblem 104 is coupled with cover 102 via fastening pins 105, each of which extends through a corresponding opening formed in cover 102.

As also shown in FIG. 1, each of fastening pins 105 comprises an enlarged knob formed on its distal end. Each of these knobs is engaged with a barrier 106 that extends from an inner surface of airbag cover 102. As discussed in greater detail below, barrier 106 may extend about an entire perimeter of each opening formed in cover 102 on the distal surface of each such opening and may be used to facilitate desired shaping of fastening pins 105 during processing and/or may be used to provide a more secure and strong fixation of emblem 104. Barrier 106 may be continuous or, in other embodiments, may have designated breaks to further facilitate processing, e.g., by allowing hot air to escape around the base, while still providing additional security to the formed knob.

Figure 2:
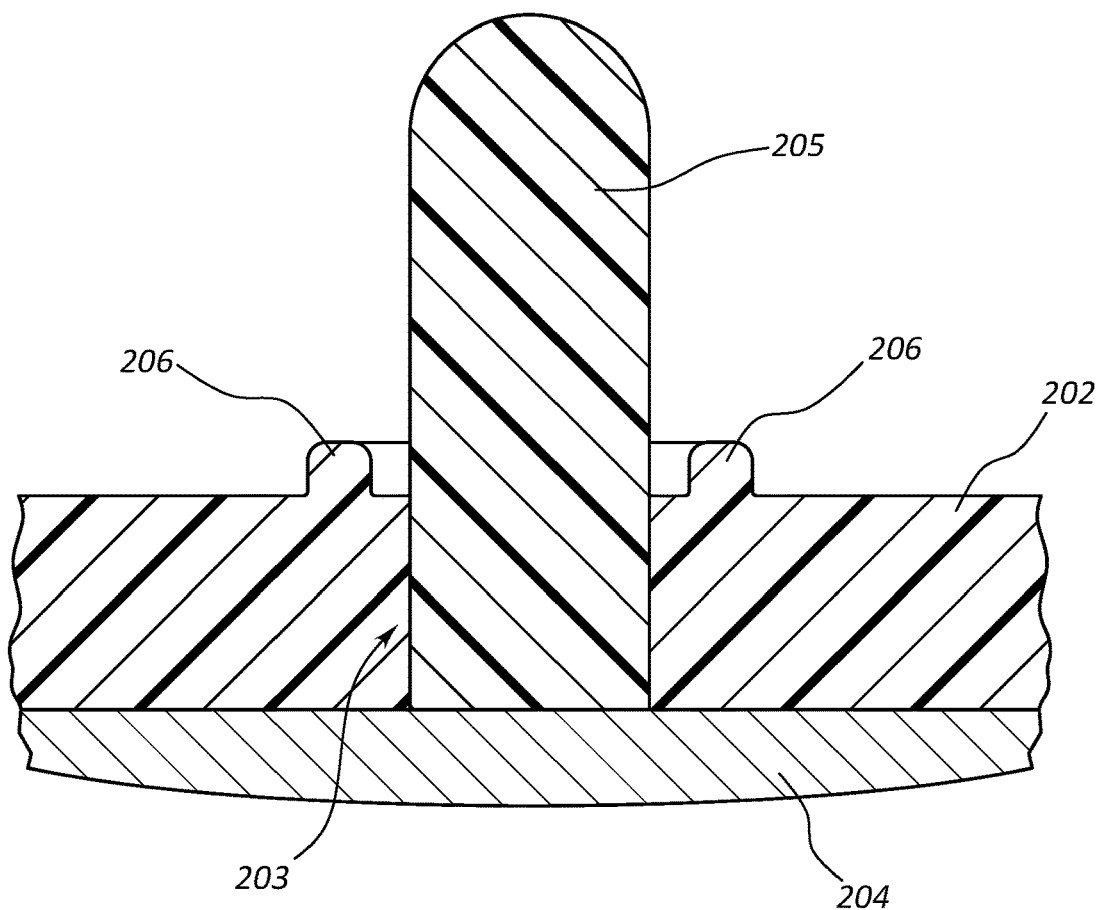
FIG. 2 is a cross-sectional view of an interface for coupling an emblem to an airbag cover according to some embodiments.

FIG. 2 depicts a cross-sectional view of an interface for coupling an emblem 204 to an airbag cover 202 according to some embodiments. The configuration depicted in FIG. 2 is preferably in a condition prior to a subsequent manufacturing/processing step in which fastening pin 205 is reshaped, as discussed below. As also shown in FIG. 2, airbag cover 202 further comprises a barrier 206 extending from an inner surface of airbag cover 202.

Figure 3:
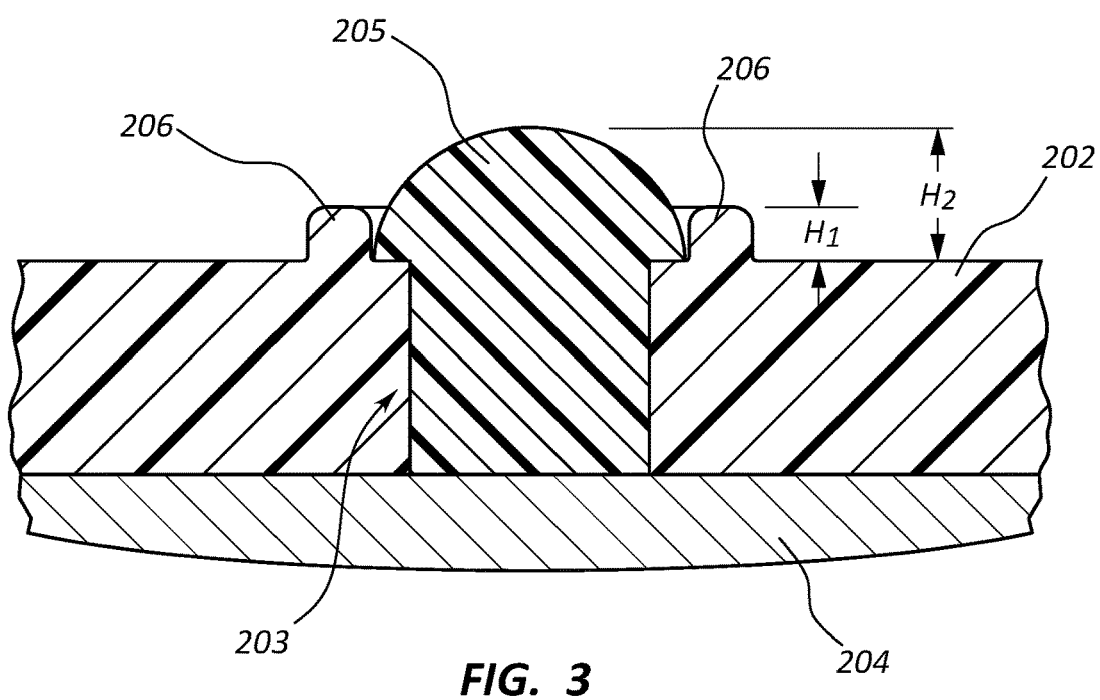
FIG. 3 is a cross-sectional view of the interface of FIG. 2 shown after processing.

Although not entirely visible in FIG. 2, it should be understood that barrier 206 preferably extends around an entire perimeter of opening 203, through which fastening pin 205 extends. Thus, for embodiments in which opening 203 has a circular shape, preferably barrier 206 extends in a circle about the perimeter of opening 203. In the depicted embodiment, there is spacing between barrier 206 and fastening pin 205, as shown in the figure. As discussed below, this spacing may allow for fastening pin 205 to be reshaped during a subsequent processing step such that an enlarged knob is formed at the distal end of fastening pin 205 and such that a lower surface of this knob contacts an inner surface of cover 202 to facilitate a more secure and/or strong coupling. Applicant further notes that, as used herein, the term FIG. 3 is a cross-sectional view of the interface shown in FIG. 2 shown after processing. More particularly, as those of ordinary skill in the art will appreciate, a tool (not shown) and/or heat, for example, may be used to reshape fastening pin 205 from the shape depicted in FIG. 2 to the shape depicted in FIG. 3. In some embodiments and implementations, this tool may be used to deliver heat to thermally reshape fastening pin 205 between the two aforementioned shapes. For example, heat may be applied externally and then the assembly may be moved to reshape the pin while the pin remains in a heated state.

In some embodiments and implementations, as discussed in greater detail below, each of fastening pins 205 may comprise a size and/or shape that is smaller than the size of the adjacent portion of its respective opening 203. In other words, the opening(s) and/or fastening pin(s) or other fastening members may be configured such that empty space is provided within the opening(s) prior to reshaping of the fastening pin(s). This reshaping may be performed such that this empty space is entirely or, in some embodiments and implementations, at least substantially entirely, filled with material from the reshaped fastening pin(s).

As shown in FIG. 3, fastening pin 205 comprises an enlarged knob at its distal end. In the depicted embodiment, this enlarged knob is formed into the shape of a mushroom head. However, various other shapes, including flat heads, for example, are contemplated. In addition, FIG. 3 depicts how barrier 206 contacts the edge/perimeter of fastening pin 205 and may be used to assist in the formation of fastening pin 205 during the processing step previously mentioned. As also shown in FIG. 3, a lower surface of the enlarged knob contacts the inner surface of airbag cover 202, which may further facilitate a desired, secure coupling of emblem 204.

In the depicted embodiment, the height of the enlarged knob of fastening pin 205 (H2) may extend beyond the height H1 of the barrier. This may allow for formation of a desired shape on the enlarged knob, such as the rounded shape depicted in FIG. 3. However, alternative embodiments are contemplated in which H2 may be the same, or at least substantially the same, as H1. In still other embodiments, H1 may be greater than H2.

Figure 4A:
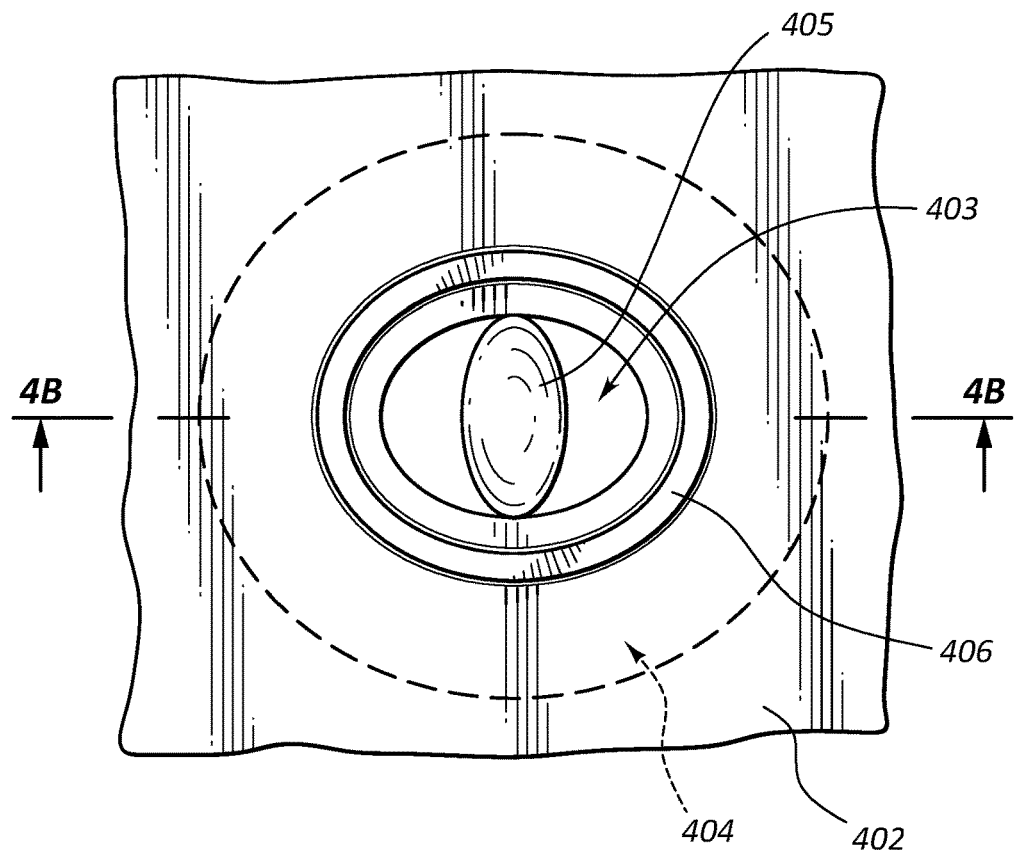
FIG. 4A is a top plan view of an interface for coupling an emblem to an airbag cover according to other embodiments.

FIG. 4A is a top plan view of another interface for coupling an emblem 404 to an airbag cover 402 according to other embodiments. The view of FIG. 4A is taken from the perspective of the inner surface of airbag cover 402. Thus, emblem 404 is shown in phantom. As shown in this image, an oval-shaped fastening pin 405 is positioned within an oval-shaped hole 403 formed in airbag cover 402. The elongated axis (in cross section) of fastening pin 405 is positioned at least approximately perpendicular relative to the corresponding elongated axis of hole 403 and is shown contacting the opposing sides of hole 403 in a direction normal to the elongated axis of hole 403. However, in alternative embodiments and implementations, fastening pin 405 may be rotated ninety degrees relative to the position shown in FIG. 4A such that the elongated axis is aligned, or at least substantially aligned, with the corresponding elongated axis of hole 403.

Although hole 403 is shown with an oval shape, a wide variety of alternative shapes are contemplated. For example, the oval shape may, in some embodiments, only be along a portion of the hole. Thus, for example, the hole may be chamfered at one or both ends to provide an oval shape or at least a portion having an elongated, non-circular shape. Other elongated shapes not strictly oval are also contemplated, both for the openings/holes and for the fastening members themselves, such as rectangular shapes or, in still other embodiments, triangular shapes or other shapes configured to provide more than two points of contact between the fastening member(s) and the opening(s) prior to reshaping/processing.

Figure 4B:
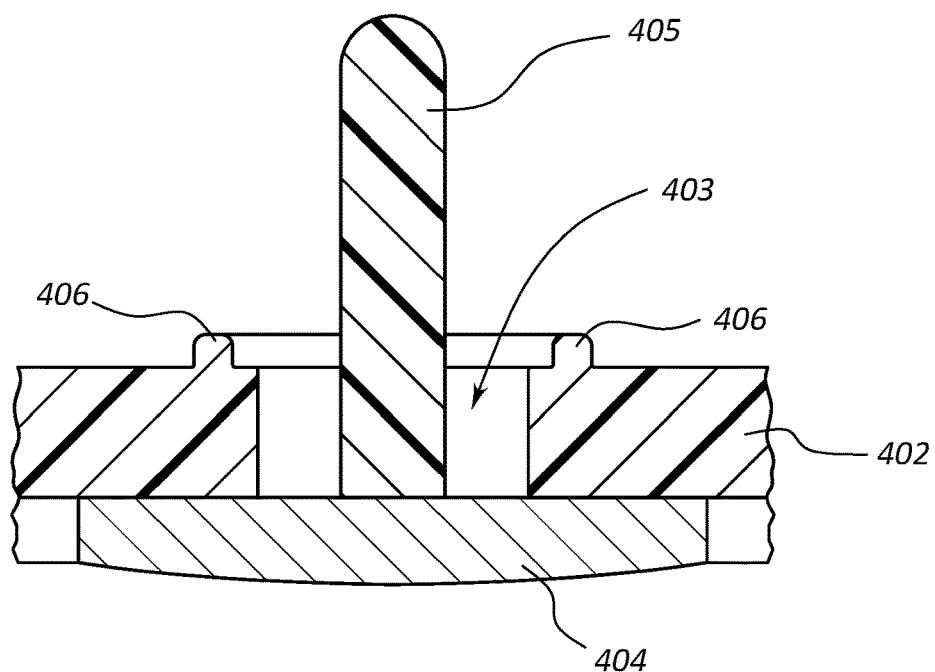
FIG. 4B is a cross-sectional view taken along line 4B-4B in FIG. 4A.

FIG. 4B is a cross-sectional view taken along line 4B-4B in FIG. 4A. As shown in both this figure and FIG. 4A, open space is left between fastening pin 405 and the material of airbag cover 402 defining hole 403 on opposite sides of fastening pin 405 along the elongated axis of fastening pin 405. However, as mentioned above, in a subsequent processing step, fastening pin 405 is reshaped such that, preferably, contact is made between fastening pin 405 and the entire portion of airbag cover 402 defining hole 403. In addition, and as also previously mentioned, in some embodiments and implementations, an enlarged knob may be formed at the distal end of the fastening pin(s) 405 or other fastening member(s), which enlarged knob may be contained and/or formed in part by barrier 406 extending from an inner surface of airbag cover 402.

Figure 5A:
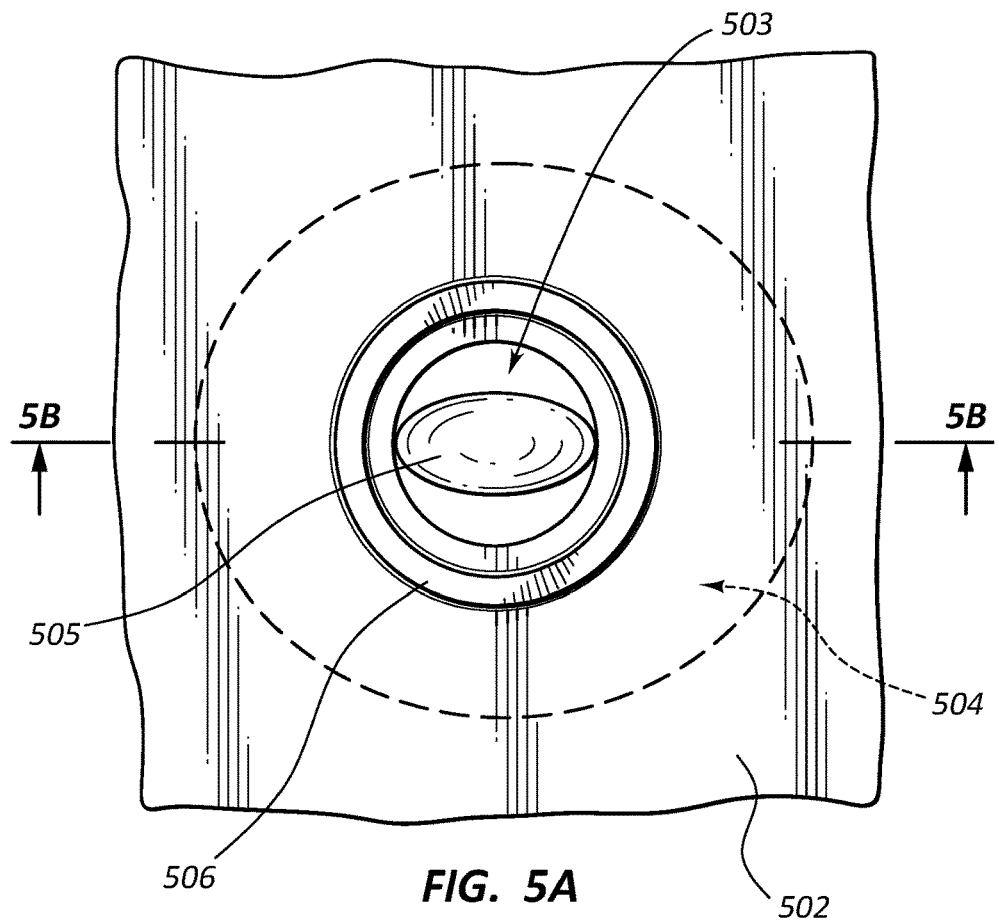
FIG. 5A is a top plan view of an interface for coupling an emblem to an airbag cover according to still other embodiments.

FIG. 5A is a top plan view of an alternative interface for coupling an emblem 504 to an airbag cover 502 according to still other embodiments. The view of FIG. 5A is, once again, taken from the perspective of the inner surface of airbag cover 502. Thus, emblem 504 is shown in phantom. As shown in this image, an oval-shaped fastening pin 505 is positioned within a circular-shaped hole 503 formed in airbag cover 502. The elongated axis (in cross section) of fastening pin 505 is positioned at least approximately perpendicular relative to the corresponding elongated axis of hole 503 and is shown contacting the opposing sides of hole 503.

Providing two or more points of contact on the edge of the openings through which the fastening pins or other fastening members are positioned may be useful for several reasons. For example, it may stabilize the assembly during the shaping process. However, it is anticipated that, in other embodiments, there may be no points of contact (or only one) initially during the shaping process. Similarly, as alluded to above, in some embodiments, there may be little or no space between the fastening pin(s) and the hole(s)/opening(s). However, the present inventor has discovered that the wedging that takes place by melting or otherwise reshaping such pins against the wall of the openings may result in a more secure and/or strong connection.

Figure 5B:
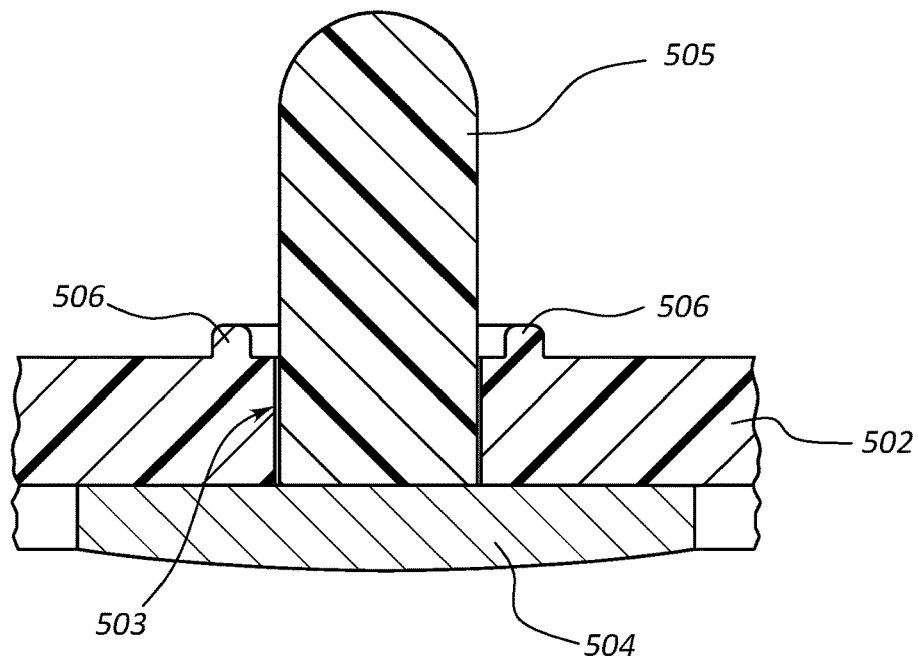
FIG. 5B is a cross-sectional view taken along line 5B-5B in FIG. 5A.

FIG. 5B is a cross-sectional view taken along line 5B-5B in FIG. 4A. As shown in both this figure and FIG. 5A, open space is left between fastening pin 505 and the material of airbag cover 502 defining hole 503 on opposite sides of fastening pin 505 along the elongated axis of fastening pin 505. However, as mentioned above, in a subsequent processing step, fastening pin 505 is reshaped such that, preferably, contact is made between fastening pin 505 and the entire portion of airbag cover 502 defining hole 503. In addition, and as also previously mentioned, in some embodiments and implementations, an enlarged knob may be formed at the distal end of the fastening pin(s) 505 or other fastening member(s), which enlarged knob may be contained and/or formed in part by barrier 506 extending from an inner surface of airbag cover 502.

Figure 6:
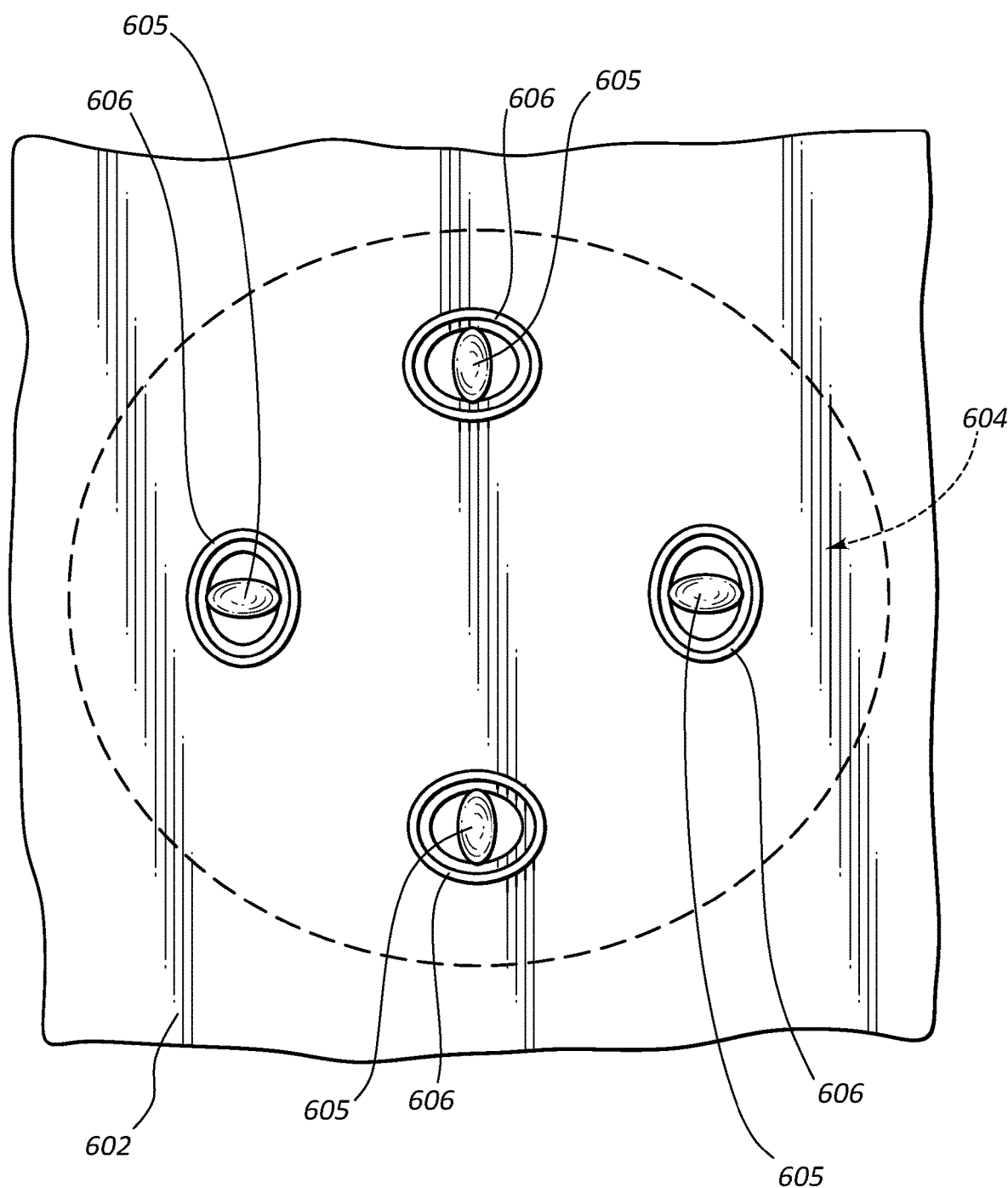
FIG. 6 is a top plan view of an interface for coupling an emblem to an airbag cover according to another embodiment.

FIG. 6 is a top plan view of another interface for coupling an emblem 604 to an airbag cover 602 according to another embodiment. In this embodiment, four separate fastening pins 605 are shown extending through four corresponding holes formed in airbag cover 602. As discussed previously, barriers 606 are shown extending about each of these holes, with spacing in between the barriers 606 and the edge of each of the respective holes. As also mentioned previously, each of the fastening pins 605 is oval-shaped and, similarly, each of the respective holes is oval-shaped in an orientation rotated ninety degrees relative to the fastening pins 605, and the opposing ends of fastening pins 605 contact opposing sides of each respective hole.

However, FIG. 6 also depicts that each of fastening pins 605 is oriented towards a center of emblem 604. In some embodiments, one or more of fastening pins 605 (in some such embodiments, all fastening pins 605) may be oriented in other directions to provide preferential strength in a desired direction/location. For example, in some embodiments and implementations, the fastening pins may be oriented along with the outer edge of the attachment and/or the rims and/or spokes of the steering wheel.

Figure 7:
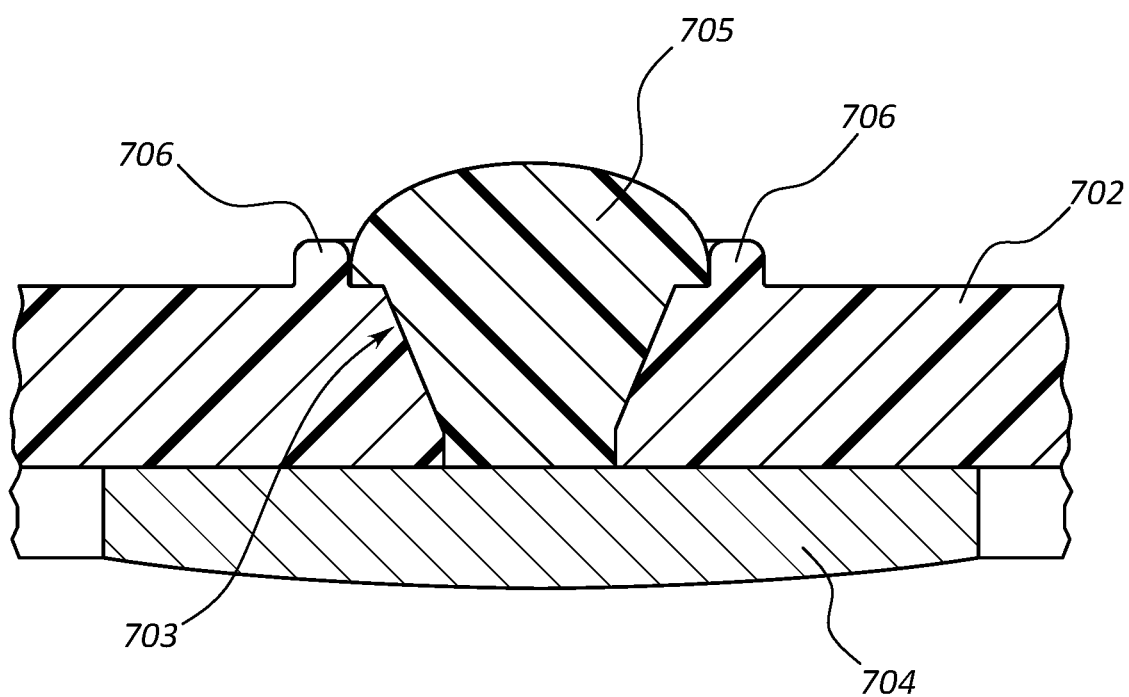
FIG. 7 is a cross-sectional view of an interface for coupling an emblem to an airbag cover according to other embodiments, shown following processing.

FIG. 7 is a cross-sectional view of yet another interface for coupling an emblem 704 to an airbag cover 702 according to other embodiments. The configuration of FIG. 7 would be following reshaping/processing, as previously mentioned. The interface depicted in FIG. 7 is similar to those previously depicted. For example, a barrier 706 extends about the perimeter of opening 703 through which fastening pin 705 extends. In addition, fastening pin 705 is formed with an enlarged knob that contacts barrier 706 and the inner surface of airbag cover 702.

However, unlike the previously-depicted embodiments, opening 703 comprises a flared portion at its distal end. More particularly, opening 703 comprises a cylindrical portion at its proximal end (relative to barrier 706) and a conical portion terminating at its distal end. This configuration may be used to provide an increased wedging of material to provide a secure coupling. Of course, other flared portion shapes are contemplated, such as a spherical cutout, for example. Moreover, it should be understood that the opening 703 may be used in connection with any of the previously described embodiments. Similarly, other features shown in FIG. 7, or in any of the other embodiments depicted and/or described herein, may be combined with any other features and/or embodiments as desired. In addition, it should be understood that, in preferred embodiments, fastening pin 705 may be formed into the shape depicted in FIG. 7 and that, prior to such reshaping, open space may be provided between fastening pin 705 and hole 703, at least in some regions. In some embodiments, this empty space may only be provided in the flared/conical section.

Figure 8A:
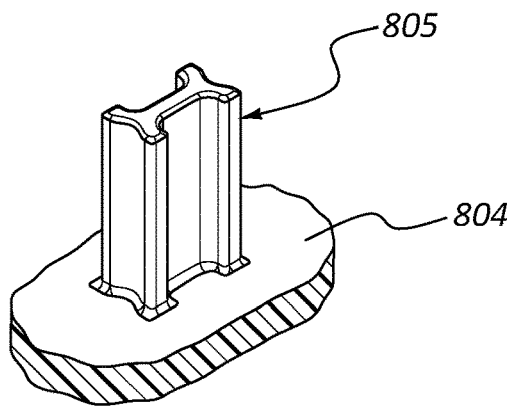
FIG. 8A depicts a perspective view of an alternative emblem comprising a fastening pin according to some embodiments.
Figure 8B:
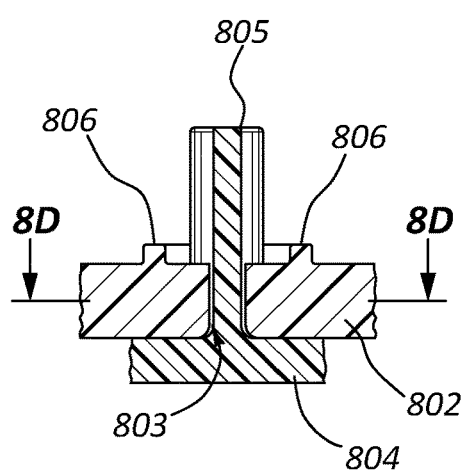
FIG. 8B depicts a cross-sectional view of the emblem of FIG. 8A inserted within an opening of an airbag cover.
Figure 8C:
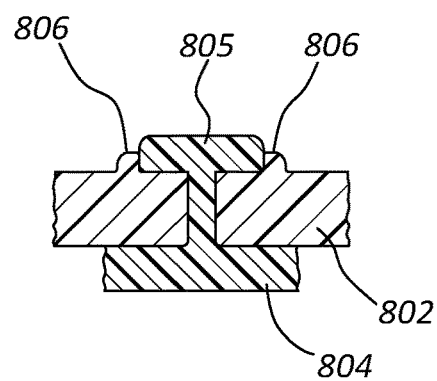
FIG. 8C depicts a cross-sectional view of the emblem and airbag cover of FIG. 8B following processing.
Figure 8D:
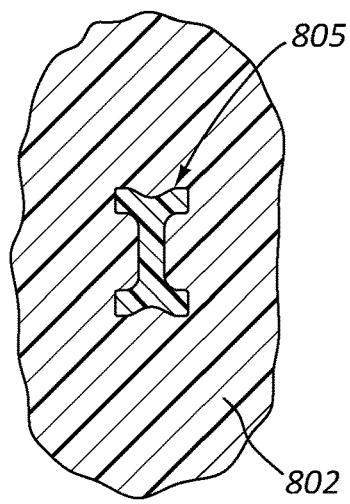
FIG. 8D is a cross-sectional view taken along line 8D-8D in FIG. 8B.
Figure 8E:
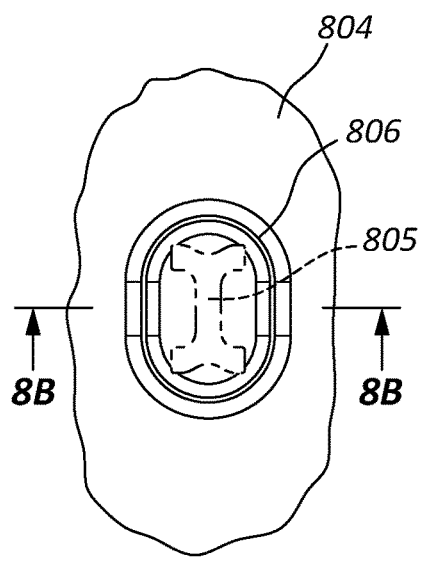
FIG. 8E is a plan view of the internal surface of an airbag cover with a fastening pin extending therethrough.

FIG. 8A depicts a perspective view of an alternative emblem 804 comprising a fastening pin 805 according to other embodiments. The depicted fastening pin 805 comprises an I-beam or H-shaped pin comprising a central elongated region and four arms extending perpendicular to the central elongated region. As depicted in FIG. 8B, fastening pin 805 may be inserted into an opening 803 in an airbag cover 802, as previously described. As also previously described, opening 802 may be slightly larger in one or more dimensions that the corresponding dimension(s) of fastening pin 805. Thus, following processing, as depicted in FIG. 8C, pin 805 may form an enlarged knob that may be constrained by barrier 806. In addition, because pin 805 generally defines a perimeter that may allow for receipt within an oval shaped or, in other embodiments, circular, opening 803, opening 803 may comprise such a shape to facilitate a secure coupling between emblem 804 and airbag cover 802. This is best shown in FIG. 8E.

Another example of a fastening pin shape is shown in FIG. 9A. FIG. 9A therefore depicts a perspective view of emblem 904 comprising a fastening pin 905 according to other embodiments. Fastening pin 905 comprises two chamfered edges at its distal end. Such chamfering may be beneficial in further strengthening the coupling between emblem 904 and airbag cover 902.

As described above in connection with other embodiments, fastening pin 906 may, again, form an enlarged knob following processing that may be constrained by barrier 906.

FIG. 10A depicts another emblem 1004 comprising a fastening pin 1005 extending through an opening 1003 in an airbag cover 1002. Opening 1003 and fastening pin 1005 each comprises a generally rectangular shape in cross section. As previously mentioned, in some embodiments, the dimensions between these two shapes may differ so as to allow for space in between the portion of airbag cover 1002 defining opening 1003 and fastening pin 1005 prior to processing. However, as shown in FIGS. 10A-10C, in other embodiments, no such space may be present. In other words, the fit between opening 1003 and fastening pin 1005 may be relatively tight instead.

FIG. 10B is a cross-sectional view of the fastening pin of FIG. 10A extending through the airbag cover opening and FIG. 10C is a cross-sectional view of the emblem and airbag cover of FIG. 10B following processing. Again, as shown in these figures, a barrier 1006 may be used to constrain fastening pin 1005 during processing if desired.

Figure 11A:
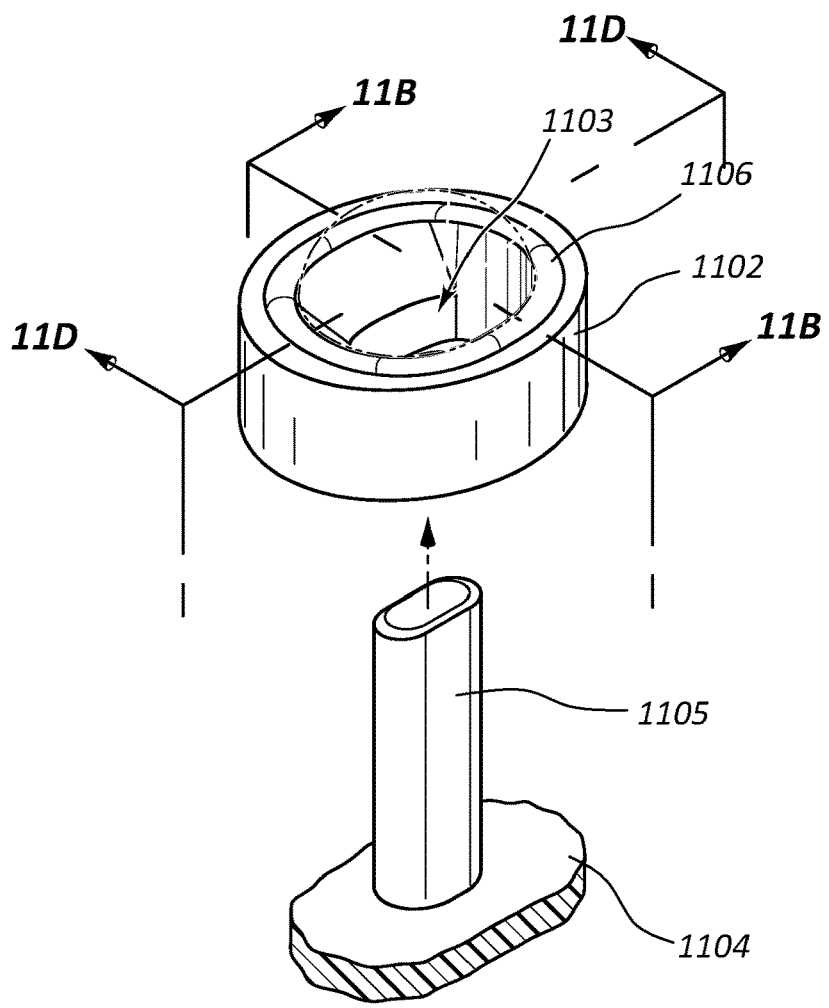
FIG. 11A depicts another embodiment of a fastening pin for an emblem extending through an opening in an airbag cover.
Figure 11B:
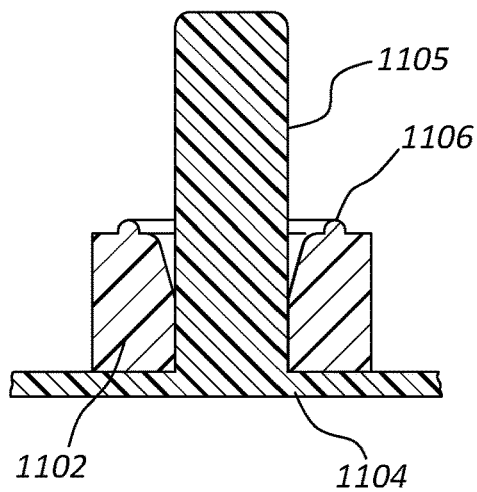
FIG. 11B is a cross-sectional view of the fastening pin of FIG. 11A extending through the airbag cover opening.
Figure 11C:
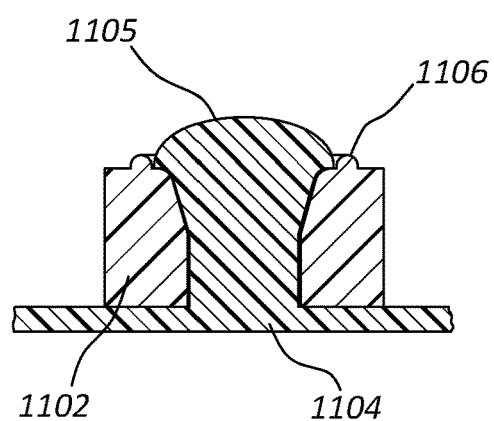
FIG. 11C is a cross-sectional view of the emblem and airbag cover of FIG. 11B following processing.
Figure 11D:
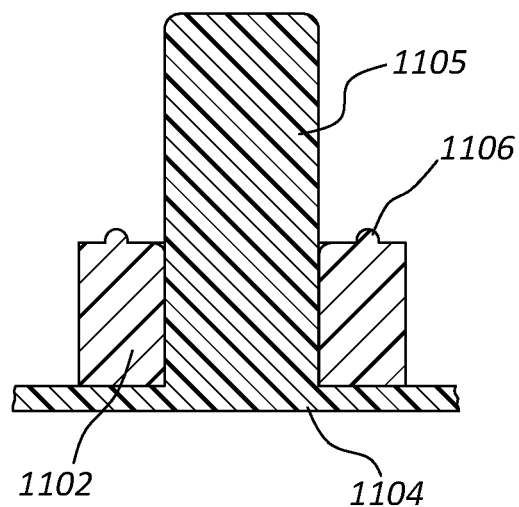
FIG. 11D is another cross-sectional view of the fastening pin of FIG. 11A extending through the airbag cover opening taken along a line perpendicular to that of FIG. 11B.
Figure 11E:
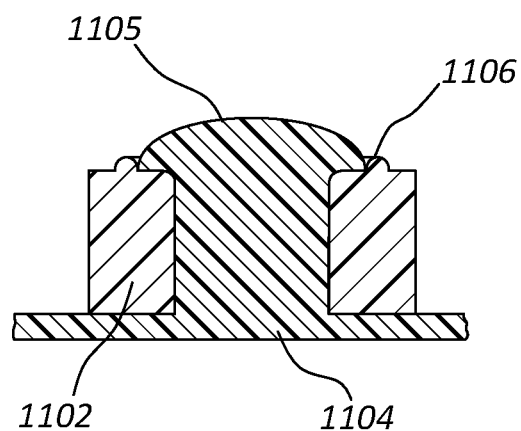
FIG. 11E is another cross-sectional view following processing taken along a line perpendicular to that of FIG. 11C.

FIG. 11A depicts still another embodiment of a fastening pin 1105 of an emblem 1104 extending through an opening 1103 in an airbag cover 1102. Unlike opening 1003, opening 1103 comprises an at least partially chamfered or angled distal end that may result in the formation of an at least partially corresponding angled or wedge-shaped distal end in pin 1105, as shown in FIG. 11C, which depicts pin 1105 following processing. As shown in FIG. 11A, opening 1103 may comprise angled distal ends on two opposing sides and non-angled sides in between the two opposing angled sides, which may result in a processed pin comprising a first set of opposing wedge-shaped sides, as shown in FIG. 11C, and a second set of opposing straight or non-angled sides, as shown in FIG. 11E. Again, a barrier 1106, which may extend wholly or partially with intermittent gaps as previously mentioned, about the perimeter of opening 1103, may be used in some preferred embodiments.

Figure 12A:
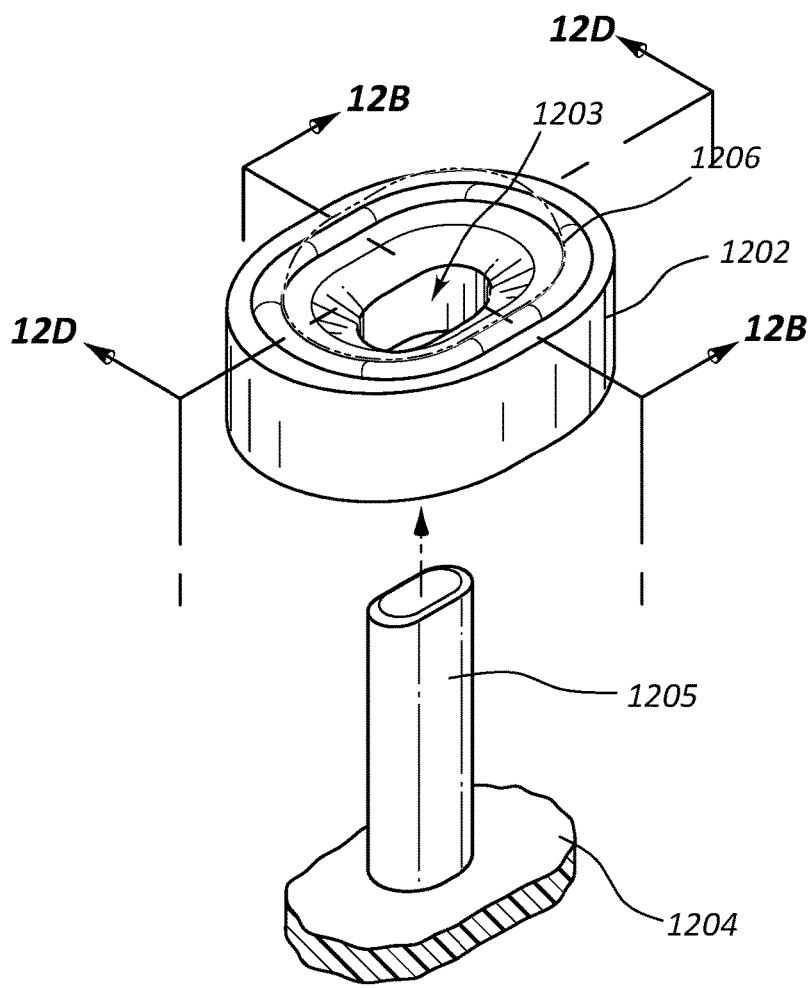
FIG. 12A depicts yet another embodiment of a fastening pin for an emblem extending through an opening in an airbag cover.
Figure 12B:
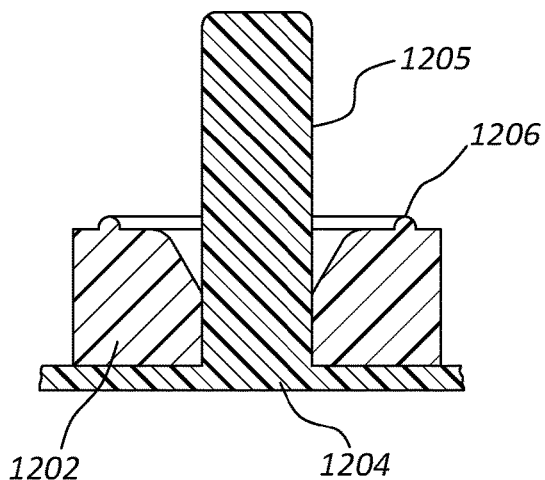
FIG. 12B is a cross-sectional view of the fastening pin of FIG. 12A extending through the airbag cover opening.
Figure 12C:
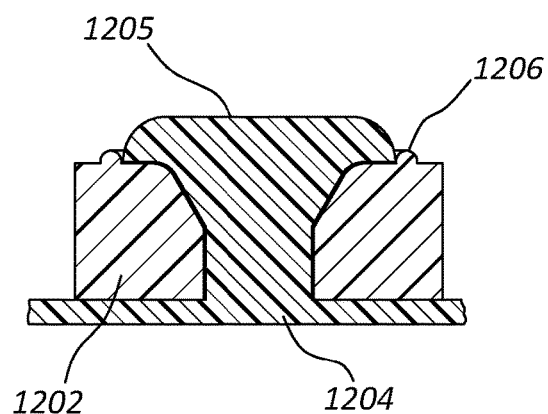
FIG. 12C is a cross-sectional view of the emblem and airbag cover of FIG. 12B following processing.
Figure 12D:
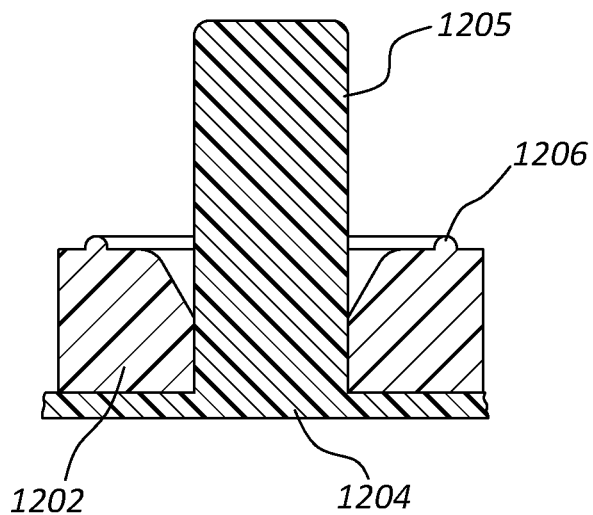
FIG. 12D is another cross-sectional view of the fastening pin of FIG. 12A extending through the airbag cover opening taken along a line perpendicular to that of FIG. 12B.
Figure 12E:
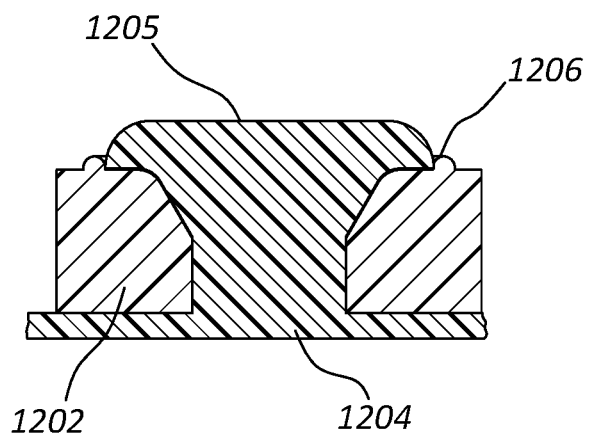
FIG. 12E is another cross-sectional view following processing taken along a line perpendicular to that of FIG. 12C.

FIGS. 12A-12E depict yet another embodiment of a fastening pin 1205 of an emblem 1204 extending through an opening 1203 in an airbag cover 1202. Like opening 1103, opening 1203 comprises an angled distal end configured to form an angled or wedge-shaped distal end in pin 1205, as shown in FIG. 12C, which depicts pin 1205 following processing. Again, a barrier 1206, which may extend wholly or partially with intermittent gaps as previously mentioned, about the perimeter of opening 1203, may be provided if desired. Unlike opening 1103, opening 1203 comprising a distal portion that is angled all the way about the periphery of opening 1203. Thus, following processing, pin 1205 comprises a wedge-shaped or angled portion that extends about the entire perimeter of pin 1205, as indicated in the two perpendicular cross-sectional views of FIGS. 12C and 12E.

Figure 13:
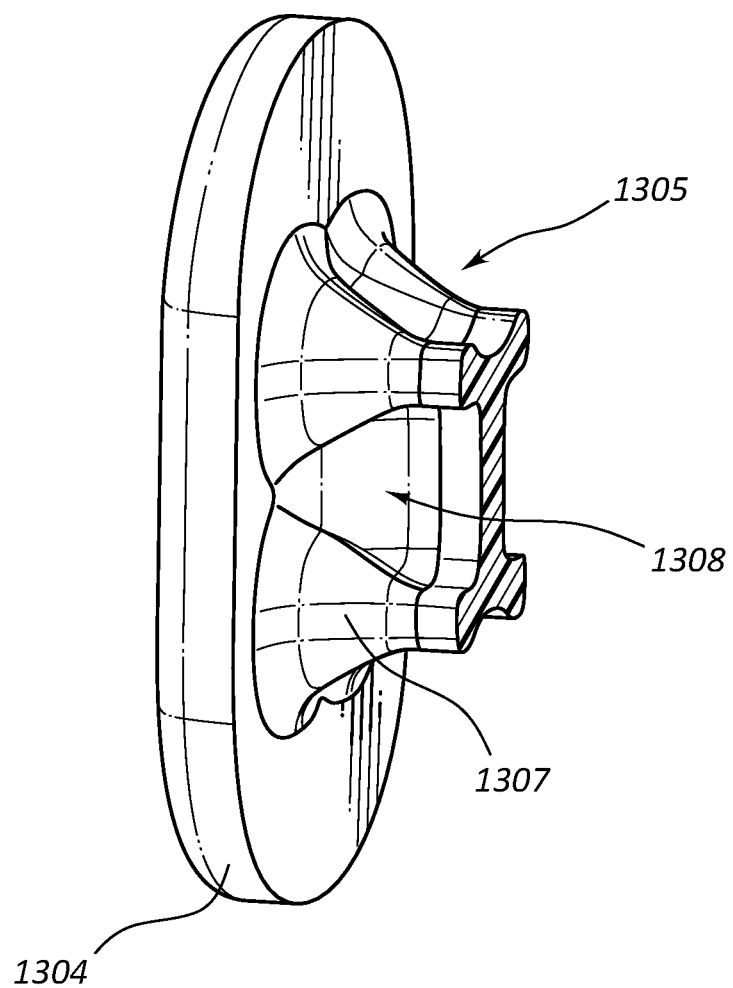
FIG. 13 is a perspective view of an emblem comprising a fastening pin according to still other embodiments.

FIG. 13 is a perspective view of an emblem 1304 comprising a fastening pin 1305 according to still other embodiments. As shown in this figure, pin 1305 again comprises an I-beam or H-shaped pin that may fit within a rectangular or oval-shaped opening (not shown in drawing) in an airbag cover. In addition, pin 1305 comprises four angled pedestals 1307 extending from the I-beam shape to the inner base of pin 1305. A cavity 1308 is formed in between each adjacent pedestal 1307, which may, once again, facilitate desired fixation between pin 1305 and a corresponding airbag cover during processing.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. An airbag module, comprising:
an airbag cover;
an emblem element coupled to the airbag cover; and
a fastening member extending from the emblem element through an opening in the airbag cover extending between an outer surface of the airbag cover and an inner surface of the airbag cover to secure the emblem element to the airbag cover, wherein at least a portion of the fastening member contacting material defining the opening in the airbag cover comprises material reshaped to contact material defining the opening in the airbag cover during a process of coupling the fastening member to the airbag cover.

2. The airbag module of claim 1, further comprising a barrier extending from the inner surface of the airbag cover about a perimeter of the opening, wherein the barrier is configured to shape the fastening member during a manufacturing process for coupling the emblem element to the airbag cover using the fastening member.

3. The airbag module of claim 2, wherein the barrier is spaced apart from the opening in the airbag cover along the inner surface of the airbag cover.

4. The airbag module of claim 3, wherein the fastening member comprises an enlarged knob formed at a distal end of the fastening member, and wherein the enlarged knob contacts and is contained by the barrier.

5. The airbag module of claim 4, wherein the enlarged knob extends beyond a height of the barrier.

6. The airbag module of claim 1, wherein the opening comprises a thru-hole, and wherein at least a portion of the thru-hole comprises a conical shape in cross section.

7. The airbag module of claim 1, wherein the opening comprises an oval shape in cross section.

8. The airbag module of claim 1, where a majority of the fastening member contacting material defining the opening comprises reshaped material.

9. The airbag module of claim 8, wherein at least substantially an entire contact interface between the fastening member and the material defining the opening comprises reshaped material.

10. A method for coupling an emblem element to an airbag cover, the method comprising the steps of:
inserting a fastening member through an opening formed within an airbag cover having an inner surface and an outer surface opposite the inner surface, wherein the fastening member comprises an elongated axis, and wherein the fastening member comprises a cross-sectional shape that is substantially smaller in area along at least a portion of the fastening member than a cross-sectional shape of the opening adjacent to the fastening member such that open space is left between the fastening member and a portion of the airbag cover defining the opening in between the inner surface and the outer surface of the airbag cover; and
reshaping the fastening member such that the cross-sectional shape of the fastening member within the opening changes to decrease the open space and secure an emblem element to the airbag cover.

11. The method of claim 10, wherein the step of reshaping the fastening member comprises thermally reshaping the fastening member.

12. The method of claim 10, wherein the step of reshaping the fastening member comprises fully occupying the open space such that the fastening member contacts the portion of the airbag cover defining the opening along the entire opening.

13. The method of claim 10, wherein the fastening member comprises a non-circular shape in cross-section.

14. The method of claim 13, wherein the fastening member comprises an oval shape in cross section.

15. The method of claim 13, wherein the opening comprises a circular shape in cross section.

16. The method of claim 13, wherein the fastening member is configured to contact the opening in at least two locations prior to the reshaping step.

17. The method of claim 10, wherein the fastening member comprises a different shape in cross-section than the opening.

18. The method of claim 10, wherein the airbag cover comprises a barrier extending from the inner surface of the airbag cover about a perimeter of the opening.

19. The method of claim 18, wherein the barrier is spaced apart from the opening in the airbag cover along the inner surface of the airbag cover.

20. The method of claim 19, wherein the step of reshaping the fastening member comprises:
   forming an enlarged knob at a distal end of the fastening member; and
   contacting the enlarged knob with the barrier such that the barrier assists in formation of the enlarged knob.

21. A method for coupling an emblem element to an airbag cover, the method comprising the steps of:
   inserting a plurality of fastening members through a respective plurality of holes formed within an airbag cover, wherein each of the plurality of holes comprises a barrier extending about a perimeter of its respective hole, wherein each of the plurality of fastening members comprises an elongated axis, and wherein each of the plurality of fastening members comprises a cross-sectional shape that is substantially smaller in area along at least a portion of each of the plurality of fastening members than a cross-sectional shape of its respective hole adjacent each of the plurality of fastening members such that open space between opposing surfaces of the airbag cover is left between each of the plurality of fastening members and a portion of the airbag cover defining each respective hole of the plurality of holes; and
   thermally reshaping each of the plurality of fastening members to occupy the open space of each of the plurality of holes with reshaped material from each of the plurality of fastening members to secure an emblem element to the airbag cover, wherein the step of thermally reshaping each of the plurality of fastening members is performed in a manner such that each of the plurality of fastening members forms an enlarged knob at its distal end.

22. The method of claim 21, wherein the step of thermally reshaping each of the plurality of fastening members is performed in a manner such that the enlarged knob of each of the plurality of fastening members contacts the barrier and such that the barrier assists in formation of each of the enlarged knobs.

23. The method of claim 21, wherein each of the plurality of fastening members comprises a first shape in cross section, wherein each of the plurality of holes comprises a second shape in cross section, and wherein the first shape differs from the second shape.

* * * * *